May 24, 1966  P. C. FISHER  3,252,214
METHOD FOR THE MANUFACTURE OF THE TIPS FOR BALL POINT PENS
Filed May 16, 1963  2 Sheets-Sheet 1
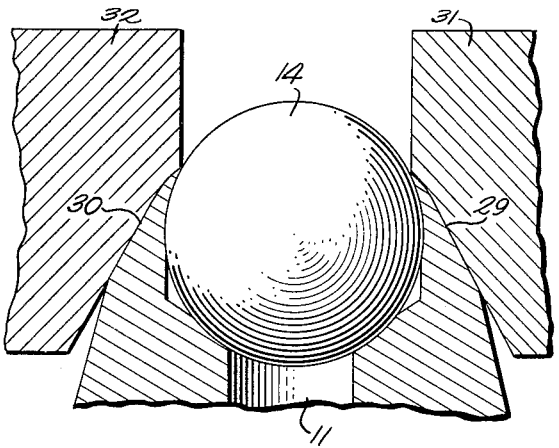
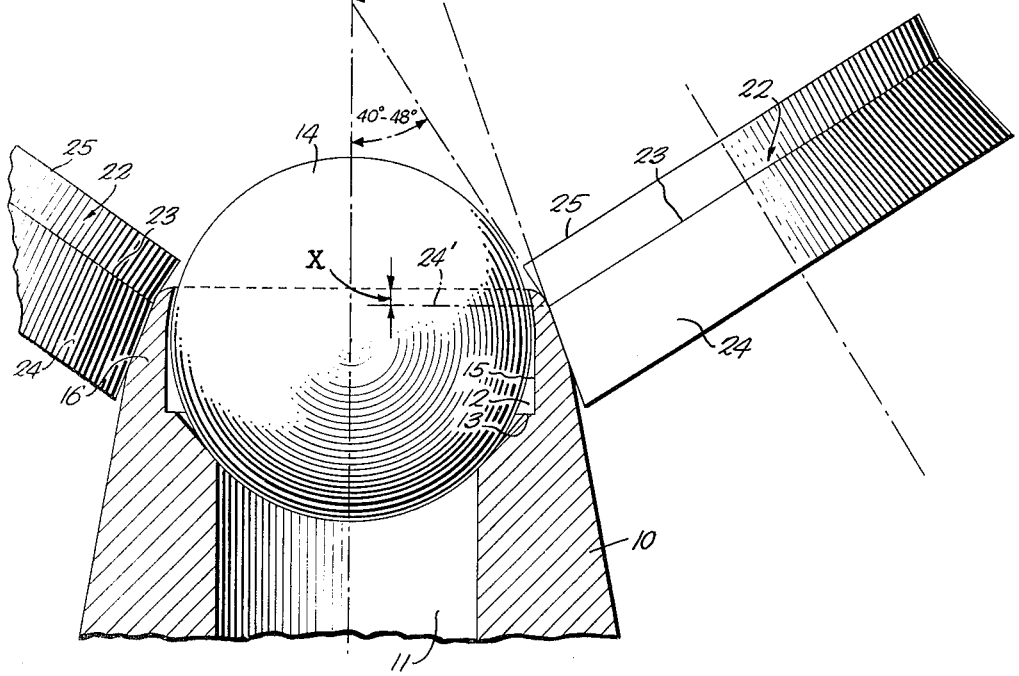
INVENTOR
*Paul C. Fisher*
BY
*Mason, Fenwick & Lawrence*
ATTORNEYS May 24, 1966 P. C. FISHER 3,252,214
METHOD FOR THE MANUFACTURE OF THE TIPS FOR BALL POINT PENS
Filed May 16, 1963 2 Sheets-Sheet 2

INVENTOR
Paul C. Fisher
BY
Mason, Fenwick & Lawrence
ATTORNEYS

United States Patent Office 3,252,214
Patented May 24, 1966

3,252,214
METHOD FOR THE MANUFACTURE OF THE
TIPS FOR BALL POINT PENS
Paul C. Fisher, 7333 Harrison St., Forest Park, Ill.
Filed May 16, 1963, Ser. No. 280,958
15 Claims. (Cl. 29—441)

This invention relates to improvements in the method used in the manufacture of the tip portions of ball point pens.

Prior to the present invention it has been customary to spin the rim of the ball socket, that is, the portion of the tip of the ink tube or cartridge that extends forwardly of the equator of the ball in the socket, by employing rollers having transversely straight working faces, so to form the rim that the ball will rotate freely with proper uniform clearance, yet be securely retained within the relatively wide ink metering zone formed by the rim.

In the use of the straight faced rollers the spun metal tips were either highly fragile and easily damaged because of excessive thinness of the rim, or if the rim were made thicker its outer edge did not become rounded by the spinning but a sharp edge was created which would scratch the paper if the pen were held at the extreme writing angle. The rounded contour of the rim is not new since it has been accomplished in the past by coining, but this involves one or more additional steps in manufacturing and militates against economy and efficiency in mass production.

One of the objects of the present invention is to make it possible to spin a ball tip, producing in a single spinning operation a thick strong ball-retaining rim that provides the ink metering zone, and having a rounded terminal edge that will glide smoothly over the paper even when the pen is at the extreme writing angle.

Another object of the invention is the provision of a method for rounding off the sharp edge of the rim and at the same time forming a relatively wide ink metering zone between said edge and the equator of said ball, by employing a roller or rollers, having a multiple angled working face, that is to say, a face circumferentially indented by a dihedral angle of uniform width said roller being positioned with the adjacent side of the annular apex of said dihedral angle substantially in the plane of the equator of the ball, the side of the dihedral angle that spins the rim in the ink metering zone being inclined to the axis of said tip at the proper angle to spin the tip, and the side adjacent the rim being inclined to said axis at such angle as to properly round the edge of said rim.

Still another object of the invention is to divide the total spinning operation between two or more rollers, suitably displaced about the axis of the tip, one or more of the rollers having a working face at an angle of approximately 45° to the axis of the tip for rounding the rim, and the other roller or rollers having the working face at an angle of approximately 30° from the axis of the tip for spinning the necessary ink metering area about the equator of the ball.

Another object of the invention is to provide a variant in the method for spinning the tip as described using rollers for rounding the edge of the rim and forming the ink metering zone, which comprises spinning the ink metering area by a roller or rollers, but employing a non-rolling tool for cutting or compressing a rounded edge on the rim through relative rotation between said rim and tool.

A further object of the invention is the provision of a method for rounding off the sharp edge of the rim and at the same time forming a relatively wide ink metering area between said edge and the equator of the ball comprising employing a roller or rollers formed with a circumferential channel in the working face thereof in a plane normal to the axis of the roller, the inner wall of said channel being curved transversely, with a shape and dimension complementary to the finished shape of the rounded edge of the rim and the shape of the spun rim in the ink metering area.

Other objects of the invention will appear as the following description of practical embodiments thereof proceeds.

In the drawings which accompany and form a part of the following specification and throughout the figures of which the same reference characters have been employed to denote identical parts:

FIGURE 1 is a view partly in elevation and partly in axial section through the tip portion of a ball point pen, and cooperating spinning rollers, parts being broken away;

Figure 5:
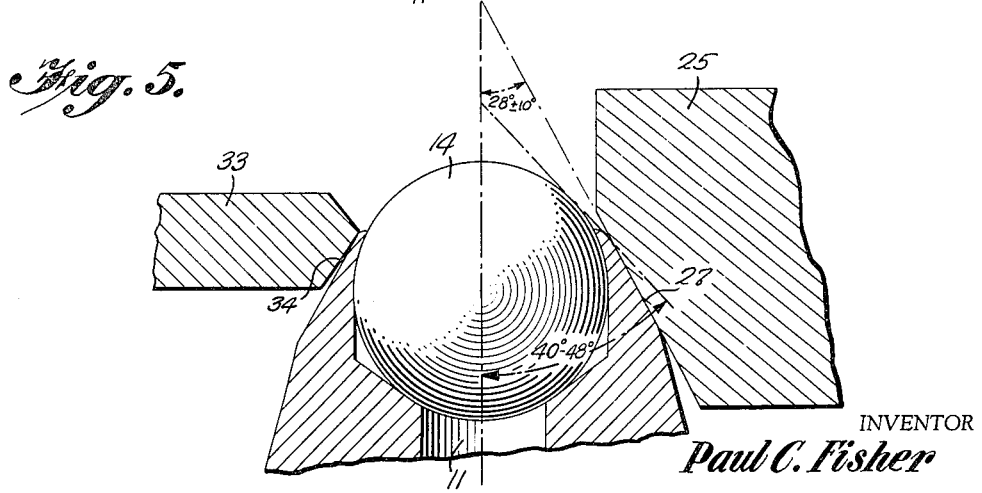

FIGURE 4 is a sectional view of another modification of the invention in which the working faces of the spinning rollers are contoured to provide concavely curved lines of contact with the rim of the tip portion of the pen for simultaneously shaping the rim in the ink metering area about the ball and rounding the edge of the lip of the rim; and FIGURE 5 is a view in section of still another modification in which a tool other than a roller is shown cooperably positioned in conjunction with a spinning roller, relative to the work piece, for simultaneously rounding the terminal edge of the work piece while the roller shapes the same in a zone adjacent said edge.

Referring now in detail to the several figures and first adverting to the disclosure of FIGURE 1, the numeral 10 represents the tip portion of the ink reservoir of a ball point pen, which is most frequently although not necessarily a cylindrical replaceable tube having a bore 11, filled with ink and which is formed with a machined socket 12 the diameter of which is greater than that of the bore forming a shoulder 13 which affords a seat for the ball 14.

The annular side wall 15 of the socket extends above the equator of the ball terminating in a plane perpendicular to the axis of the ink reservoir. The tip portion 10 tapers toward the ball end of the pen extending to a level beyond the equator of the ball. The part of the side wall of the socket that extends from the base to the plane of the equator may be called the external cone of the socket. The inner wall of this part being parallel to the axis of the reservoir makes the part sufficiently thick, except as it approaches the equatorial plane, so as not to be affected by spinning or by the preliminary step of coining.

Figure 2:
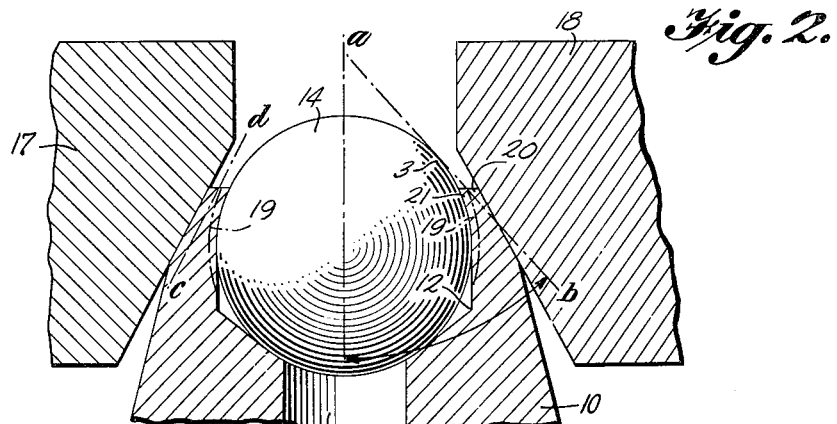
FIGURE 2 is a diagrammatic view of the end portion of the tip, including the ball, and spinning rollers in position to shape the parts with which they are engaged.

By turning for a moment to FIGURE 2 which is a diagrammatic illustration of prior art procedure, one may note that as shown in full lines the interior wall of the socket 12 and the surface of the ball 14 are in contact throughout a zone that includes the equator of the ball and which extends quite to the edge of the rim 16. The constriction of the surrounding wall of the socket to place it in contact with the ball was done by means of a conically recessed die, not shown, placed over the tapered portion 10 and forced down with an impactive thrust. This contraction gives the side wall of the socket the exact shape of the ball throughout the area of contact, this serving as a precise datum against which the spinning roller acts in expanding the metal, so that a narrow space of uniform width is formed between ball and rim, supplied with ink from the reservoir, and retaining a film of ink by surface tension, this space constituting the ink metering area, also a narrow space of uniform width is created between the terminal edge of the rim and the ball. This is the relation of the side wall of the socket to the ball in FIGURE 1, the spinning operation having been completed. The coining step for bringing the side wall of the socket into engagement with the ball is used as a preliminary step in the practise of the present invention.

FIGURE 2 illustrates the conventional method of spinning the tip to obtain the desired ink metering clearance. The tip is shown with its axis vertical and two rollers 17 and 18 are positioned at opposite sides and in contact with the tip to balance the stresses of lateral pressure. The working faces of the rollers are so shaped as to be straight in axial cross section whereby their successive lines of tangency with the tip portion 10 under rotation are straight and convergent toward the axis of the tip. The rollers are lowered or the pen raised to press the working faces against the convergent surface of the tip portion. The broken-line arcs 19, concentric with the ball in the region of the equator and extending to the edge of the rim define the ink metering zone produced by expansion in size of the surrounding inner wall of the rim resulting from the spinning. The position of the working faces of the rollers and the shape of the exterior surface of the rim engaged by them represent their relationship at the completion of a normal spinning step.

The line a-b in FIGURE 2 represents the plane of a sheet of writing paper with the pen at the extreme writing angle indicated by the arrow ended arc between the line a-b and the axis of the pen.

If the pen in FIGURE 2 be held in writing position with the ball tangent to the paper, the pen cannot be moved forward without the sharp edge 20 that projects beyond the plane of the paper scratching the paper when the pen is at the extreme writing angle. This would necessitate that the pen be held, for writing, at an uncomfortable angle toward the vertical.

If it were attempted to obliterate this extended sharp edge by continuing to spin the rim to reduce the exterior size of the rim to the extent indicated by the line c-d, this would bring the terminal edge close to or within the plane of the paper so as to avoid scratching, but it would thin the rim to such extent as to be readily damaged if the pen were let fall, possibly denting the thin walled rim forcing it against the ball so that the latter cannot rotate and pick up ink, and altering the concentricity of the space in the ink metering zone, ruining the pen.

It is apparent from FIGURE 2 that if the spinning of the rim were not continued to the line c-d the thickness of the rim below the rim lip 21 would be retained, and if the roller 18 were tilted so that its line of contact with the rim were parallel to the sheet of paper it could spin the rim lip so as to bring its surface down to a position between the ball and the plane of the paper or even to a degree or so outside of this plane, for even then it would lie flat enough to slide along the paper without scratching it. Of course there are insurmountable objections to the practicability of tilting a "straight" roller. In the first place it would be an additional spinning step and unacceptable from the standpoint of mass production. Secondly, the rollers are exceedingly small—the standard ball being about one millimeter in diameter—and could not be practically adjusted to precisely hold different positions. Furthermore, the spun area shaped by the tilted roller would intersect at an angle the previously spun ink metering area, the line of intersection appearing as a ridge about the rim capable of creating noticeable friction when the pen is moved forward.

Figure 3:
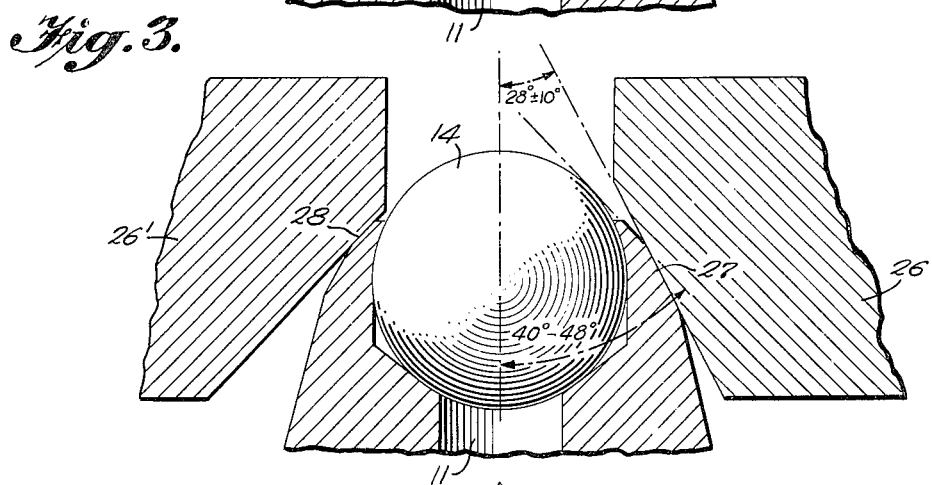
FIGURE 3 is a view in section of a modified form of the invention in which the spinning function involved in simultaneously shaping the tip of the pen is divided between correlated rollers.

The present invention avoids these objections and provides a practical means and method for rounding off the sharp edge of the rim by spinning, and at the same time forming, by spinning, a relatively wide metering area in a zone of the rim extending about the equator of the ball, the spinning operations being made simultaneous through the use of the double angled rollers 22 of FIGURE 1, or their equivalent structures shown in FIGURES 3 and 4 and which will presently be described. It will be readily understood that for best results the spinning instrumentalities should be mounted as an opposite pair as shown in FIGURE 1, as a cluster of three at 120° angular displacement, or in some other arrangement in which the laterally applied pressures will be balanced.

In FIGURE 1 the working faces of the rollers 22 are indented by a wide dihedral angle extending thereabout having its circumferential apex 23 lying in a plane perpendicular to the axes of the rollers and having a mean angular width of said dihedral angle of 164°, with a permissible angular range of plus or minus 10° for the side that spins the rim, and a permissible angular range of plus or minus 4° for the side that rounds the lip. The sides 24 and 25 of the dihedral angle are frusto-conical, their lines of contact with the respective surfaces of the rim in the region of the ink metering area, and of the rim lip, being symmetrically convergent toward the produced axis of the tip. The arc of the apex of the dihedral angle that lies adjacent should be precisely located at the level of the base line 24' of the lip of the rim and said base line should be held to a distance X of from 2% to 8% of the diameter of the ball. If the roller should be positioned so that the adjacent end of the apex is below the line 24', the ink metering area will not be spun with uniform clearance. If it is above said line the side 25 of the dihedral angle will fail to round off the sharp edge of the rim. The length of the lip above base line must be sufficient to retain the ball. Beyond this its length is largely determined by variations in the depth to which the ball is seated in the socket. The diverse angular relation of the respective sides of the dihedral to the axis of the tip is what prompts the name "double angled" to be given to the rollers.

Restricted mainly by the length of the lip, the minimum angle at which the conventional ball point pen can be held relative to the writing surface is about 45°. If it is held any flatter scratching is experienced. That is because most rims are spun thin with flat rollers, no attempt being made to round the resulting sharp edge. By the present invention the edge is rounded so that the pen can be held several degrees flatter against the paper, gliding on the rounded edge of the lip. FIGURE 1 indicates a range of angularity of the angle between rim and axis of 38°, the minimum angle between pen and paper. Inherently, it could not be held flatter for the rim would function as a fulcrum and lift the ball off the paper.

The range of magnitude of the angle between the line of contact of the side 25 and the axis of the tip, 40°–48° as indicated in FIGURE 1, has been determined by experimentation. The concave face of the lip confronting the ball, being arcuate, resists pressure from outside so that it may be considered fixed, maintaining uniform the width of the space between itself and the ball. This being the case there must be some space provided between the boundary formed by this concave face and the working face of the roller, above the base line 24' of the lip to receive the metal displaced in the course of rounding the lip. The angle formed between the line of contact of the side 25 and the axis of the tip affords this space, which can vary within the indicated range according to the mass of metal to be displaced.

Referring now to FIGURE 3, a modification of the invention is shown in which two "straight" rollers 26 and 26' are employed having their lines of contact with the rim of the tip, 27 and 28, diametrically opposite, the line 27 making an angle with a range of 28° plus or minus ten degrees, with the axis of the tip, and the line 28 making an angle with a range of 40° to 48° with said axis. The line of contact 27 therefore corresponds to the elements of the side 24 of the dihedral in FIGURE 1 while the line 28 corresponds to the elements of the side 25.

These rollers do the same job as the rollers in FIGURE 1, simultaneously spinning the rim of the tip in the region to produce the ink metering area, and spinning the lip to round the edge of the lip.

There is a profound distinction between the performance of the prior art "straight" rollers of FIGURE 2, in which each working face has the *same* angle, and the operation of the straight rollers having *diverse* angles as shown in FIGURE 3. It has been pointed out that the rollers in FIGURE 2 are capable of doing just one thing, spinning the rim to open the ink metering gap between the rim and ball, and if they were titled they would, in tilted position, necessarily intersect the completely spun contour produced by the rollers before they were tilted, and impose upon the area of intersection a contour, resultant of a plurality of consecutive passes, therefore representing an appreciable change of shape, producing a ridge along the juncture of the intersecting contours capable of causing perceptible friction when the pen is moved over the paper.

In the subject invention, the rollers in FIGURE 3, operating simultaneously and in alternate phase, do not superpose a stack of diminishing spiral contours of one upon a similar stack made by the other and thus cause a ridge, but together they make *interleaved* slight changes in contour so that the last pass of a roller produces so slight a change that no appreciable ridge is formed.

In FIGURE 4 a slight modification of the invention is illustrated in which the dihedral angular recess in the rollers has been substituted by a circumferential working face of concave curvature in which the lines of contact 29 and 30 of the rollers 31 and 32 with the rim portion are smooth curves of such length as to simultaneously spin the portion of the rim in the zone of the ink metering area and to round the edge of the lip. The extreme portions of the curved lines of contact may merge into and terminate in straight portions having the same angular relationship to the axis of the tip as in the embodiment of the invention illustrated in FIGURE 1.

Still another embodiment of the invention is illustrated in FIGURE 5 in which one or more straight rollers 25 are employed to spin the rim in the ink metering zone, but a tool not a roller is provided positioned to cooperate with said roller and for rounding said lip.

It has been suggested in the objects of invention that the movement between the pen and spinning instrumentalities is relative, from which it follows that it may be a matter of choice whether power is applied to the pen support (not shown) or to the rollers to drive them. In the embodiment shown in FIGURE 5 the tool for rounding the lip is a bar 33 which is fixed, so in this instance the pen will be positively rotated. While, as shown, a single roller and the bar are oppositely positioned it is obvious two rollers and a bar displaced at 120° intervals would do equally well. The roller in FIGURE 5 is identical with the similarly positioned roller 25 in FIGURE 3, its line of contact having the same angular relation to the axis of the tip, and its working face spinning the same contour on the rim in the zone of the ink metering area.

The bar 33 may be of any desired thickness in a plane perpendicular to the axis of the tip and it is preferably formed with a linear edge 34 curved complementary to the desired shape to which the edge of the lip is to be rounded. The lower part of the linear edge is made to overlap the spun surface in the adjacent zone made by the roller and so shaped that the contour that it imparts to the lip merges with said surface. The linear edge may be made sharp so that it has a cutting as well as a spinning function.

In summary it may be stated that due to the necessity of having the end of the tip surround the ball sufficiently beyond its equatorial plane to retain the ball, and at the same time to keep the end of the tip sufficiently thick to resist easy damage the conventional ball point cannot be held at a sufficiently large angle to the writing surface to suit the writing habits of a great many people. Conscious effort is required to hold the pen up beyond the critical angle and the hand readily reverts to its natural position in which the tip scratches the paper or the ball is lifted due to fulcruming of the tip against the paper, interrupting the writing. To such folks the conventional ball point pen is unacceptable.

The minuteness of the parts involved and the smallness of the possible tolerances are such as to leave very little obvious opportunity for radical improvement. The present invention, however, has enabled the manufacture of a ball point pen which has gained a few degrees in the angle at which it may be held against the writing surface without scratching. Some of this gain has been due to the rounding of the edge of the lip so that even when the pen is held so that the lip touches the paper it glides without scratching. The flatness of the angle obtained through the exercise of the present invention has made the range of attitude of the pen compatible with the writing habits of most people.

Applicant has done this by simultaneous spinning of the rim of the tip, for internal clearance with respect to the ball and for rounding the lip of the rim, thus reducing the complication and number of steps of manufacturing, permitting more accurate and efficient mass production.

It is to be understood by those skilled in the art that the specific details of construction and arrangement of parts as herein described is by way of illustrating the invention and not to be construed as limiting its scope.

What is claimed is:

1. In the method of spinning the ball-surrounding rim of an ink reservoir in a zone to create the ink metering clearance between the rim and ball, and at the same time spinning the terminal lip of the rim, that retains the ball to round the end thereof, a roller by means of which the two spinning steps are simultaneously performed, said roller having a working face contoured by meeting conical surfaces to form a re-entrant dihedral having its circumferential apex perpendicular to the axis of the roller, the mean angular width of said dihedral being 164° with a permissible angular range of plus or minus 10° for the side that spins the rim in said zone, and a permissible angular range of plus or minus 4° for the side that rounds the lip.

2. Method of finishing a partially manufactured component of a ball point pen, said component comprising an ink reservoir having a socket at one end, and a ball seated in said socket to such depth that the rim of the socket including its terminal lip ends in a plane perpendicular to the axis of said socket and intersecting said ball at such distance above its parallel equatorial plane that the rim, in the finished component, will retain the ball in the socket, the rim in the partially manufactured component being in surface contact with said ball throughout a zone extending from said equatorial plane to said lip, said method comprising, providing spinning rollers positioned in balanced relation to said rim, with respect to lateral stresses, said rollers having peripheral conical working faces, the working face of one being positioned in operative contact with said rim in said zone, the produced lines of contact of said face with said rim intersecting the produced axis of said rim at an angle of 28° plus or minus 10°, the working face of another being positioned in operative contact with said lip, the produced lines of contact of said last named working face with said lip making an angle of 44° plus or minus 4° with said produced axis, the rollers being so positioned that the spun surfaces produced by each are contiguous.

3. The method of spinning a rim surrounding a ball to form a ball point writing instrument comprising: forming an ink metering area between the rim and the ball by spinning the outer portion of the rim with a surface at an angle of about 28° plus or minus 10° to the axis of the rim, and simultaneously spinning the terminal lip of the rim with a surface at an angle of about 40° to 48° to the axis of the rim.

4. Method of finishing a partially manufactured component of a ball point pen as claimed in claim 3, said method comprising diverse instrumentalities for simultaneously spinning the rim and rounding the lip of said component, angularly displaced about the axis of said rim in mutually opposed relation, one of said instrumentalities being a spinning roller having a working face positioned in operative relation to said rim in said zone for spinning the rim, thereby creating the ink metering clearance between said rim and ball, another of said instrumentalities comprising a non-rotatable tool having a working face contacting said lip for rounding the end thereof through rotation of said component against the working face of said tool.

5. Method of finishing a partially manufactured component of a ball point pen as claimed in claim 3, said method comprising providing diverse instrumentalities for simultaneously spinning the rim and rounding the lip of said component, angularly displaced about the axis of said rim in mutually opposed relation, one of said instrumentalities being a spinning roller having a working face positioned in operative relation to said rim in said zone for spinning the rim, thereby creating the ink metering clearance between said rim and ball, another of said instrumentalities comprising a non-rotatable tool having a working face contacting said lip for rounding the end thereof through rotation of said component against the working face of the tool, the working face of said tool including a cutting edge.

6. Method of finishing a partially manufactured component of a ball point pen as claimed in claim 3, said method comprising providing diverse instrumentalities for simultaneously spinning the rim and rounding the lip of said component, angularly displaced about the axis of said rim in mutually opposed relation, one of said instrumentalities being a spinning roller having a working face positioned in operative relation to said rim in said zone for spinning the rim, thereby creating the ink metering clearance between said rim and ball, another of said instrumentalities comprising a non-rotatable tool having a working face contacting said lip for rounding the end thereof through rotation of said component against the working face of the tool, the produced lines of contact of the working face of said roller with said rim intersecting the produced axis of said rim at an angle of 28° plus or minus 10°, and the lines of contact of said non-rotatable tool with said lip intersecting said produced axis at an angle of 44° plus or minus 4°.

7. The method of claim 3, wherein the spinning of the outer portion of the rim and also the terminal lip of the rim is accomplished by a roller having a dihedral angle of 164° with a permissible angular range of plus or minus 10° for the side that spins the rim, and a permissible angular range of plus or minus 4° for the side that rounds the lip.

8. The method of claim 3, wherein the portion of the lip spun by the said surface at 40° to 48° to the axis of the rim is coincident with a tangent to said ball from said portion.

9. The method of spinning a rim surrounding a ball to form a ball point writing instrument comprising: forming an ink metering area between the rim and the ball by spinning the outer portion of the rim with a surface at an angle of about 28° plus or minus 10° to the axis of the rim, and simultaneously spinning the terminal lip of the rim with a surface at an angle of about 40° to 48° to the axis of the rim until the terminal lip ends in a plane perpendicular to the axis of the writing instrument and intersects said ball at a distance above the parallel equatorial plane of the ball equal to 2% to 8% of the ball diameter.

10. The method of claim 9, wherein the spinning of the outer portion of the rim and also the terminal lip of the rim is accomplished by a roller having a dihedral angle of 164° with a permissible angular range of plus or minus 10° for the side that spins the rim, and a permissible angular range of plus or minus 4° for the side that rounds the lip.

11. The method of spinning a rim surrounding a ball to form a ball point writing instrument comprising: forming an ink metering area between the rim and the ball by spinning the outer portion of the rim with a surface at an angle to the axis of the rim, and simultaneously spinning the terminal lip of the rim with a surface at an angle of about 40° to 48° to the axis of the rim.

12. The method of claim 11, wherein the spinning of the outer portion of the rim and also the terminal lip of the rim is accomplished by a roller having a dihedral angle of 164° with a permissible angular range of plus or minus 10° for the side that spins the rim, and a permissible angular range of plus or minus 4° for the side that rounds the lip.

13. The method of claim 11, wherein the spinning of the outer portion of the rim and also the terminal lip of the rim is accomplished by a roller having a dihedral angle of 164° with a permissible angular range of plus or minus 10° for the side that spins the rim, and a permissible angular range of plus or minus 4° for the side that rounds the lip.

14. The method of claim 11, wherein the portion of the lip spun by the said surface at 40° to 48° to the axis of the rim is coincident with a tangent to said ball from said portion.

15. The method of spinning a rim surrounding a ball to form a ball point writing instrument comprising: forming an ink metering area between the rim and the ball by spinning the outer portion of the rim with a surface at an angle to the axis of the rim, and simultaneously spinning the terminal lip of the rim with a surface at an angle of about 40° to 48° to the axis of the rim until the terminal lip ends in a plane perpendicular to the axis of the writing instrument and intersects said ball at a distance above the parallel equatorial plane of the ball equal to 2% to 8% of the ball diameter.

References Cited by the Examiner
UNITED STATES PATENTS

| | | | |
|---|---|---|---|
| 2,498,009 | 2/1950 | Schrader et al. | 29—441 |
| 2,891,511 | 6/1959 | Fehling | 29—441 |
| 3,009,240 | 11/1961 | Brown | 29—441 |

JOHN F. CAMPBELL, *Primary Examiner.*

THOMAS H. EAGER, *Examiner.*